United States Patent
Knudsen et al.

(10) Patent No.: US 8,170,510 B2
(45) Date of Patent: May 1, 2012

(54) MINIMIZING MUTUAL COUPLING

(75) Inventors: Mikael Bergholz Knudsen, Gistrup (DK); Bernd Adler, Neubiberg (DE); Peter Bundgaard, Aalborg (DK); Jan-Erik Mueller, Ottobrunn (DE); Gert F Pedersen, Storvorde (DK); Mauro Pelosi, Aalborg (DK)

(73) Assignee: Intel Mobile Communications GmbH, Neubiberg (DE)

( * ) Notice: Subject to any disclaimer, the term of this patent is extended or adjusted under 35 U.S.C. 154(b) by 420 days.

(21) Appl. No.: 12/475,352

(22) Filed: May 29, 2009

(65) Prior Publication Data
US 2010/0304688 A1 Dec. 2, 2010

(51) Int. Cl.
*H04B 1/04* (2006.01)
(52) U.S. Cl. .................................. 455/121; 455/129
(58) Field of Classification Search .................. 455/91, 455/114.1, 115.1, 115.2, 116, 120, 121, 126, 455/1, 128, 129, 269; 375/295, 296
See application file for complete search history.

(56) References Cited

U.S. PATENT DOCUMENTS

| | | | |
|---|---|---|---|
| 6,006,117 A * | 12/1999 | Hageltorn et al. | 455/129 |
| 7,362,266 B2 * | 4/2008 | Collinson | 342/372 |
| 2010/0248651 A1 * | 9/2010 | Dent | 455/78 |
| 2011/0006949 A1 * | 1/2011 | Webb | 342/372 |
| 2011/0151810 A1 * | 6/2011 | Su et al. | 455/129 |

OTHER PUBLICATIONS

Chebihi, Anissa et al., "A Novel Isolation Technique for Closely Spaced PIFAs for UMTS Mobile Phones", IEEE Antennas and Wireless Propagation Letters, vol. 7, 2008, pp. 665-668.
Diallo, C. Luxey, P. Le Thuc, R. Staraj, G. Kossiavas, "Enhanced Diversity Antennas for UMTS Handsets", IWAT, Cambridge, Mar. 21-23, 2007.
Pelosi, M. et al., "A Grip Study for Talk and Data Modes in Mobile Phones", IEEE Transactions on Antennas and Propagation, vol. 57, No. 4, Apr. 2009, pp. 856-865.
Pelosi, M. et al., "Influence of dielectric loading on PIFA antennas in close proximity to user's body", Electonic Letters, Feb. 26, 2009, vol. 45, No. 5, 2 pages.
Pelosi, Mauro; Ondrej, Franek; Pedersen, Gert F.; Knudsen, Mikael, "User's Impact on PIFA Antennas in Mobile Phones," Vehicular Technology Conference, 2009. VTC Spring 2009. IEEE 69th , vol., No., pp. 1-5, Apr. 26-29.
"User's Impact on PIFA Antennas in Mobile Phones", Pelosi et al., Four (4) pages, COST2100 6th MCM, Lille, Oct. 2008.

* cited by examiner

*Primary Examiner* — Thanh Le
(74) *Attorney, Agent, or Firm* — SpryIP, LLC

(57) ABSTRACT

Disclosed herein are techniques, systems, and methods relating to minimizing mutual coupling between a first antenna and a second antenna.

20 Claims, 7 Drawing Sheets

MINIMIZING MUTUAL COUPLING

BACKGROUND

The mobile communication industry is facing the demand of high data rate (and applications, e.g. video applications) on mobile phones to compete with the data rate on wired systems. To meet the increasing demand, standards such as High Speed Downlink Packet Access (HSDPA) and High Speed Uplink Packet Access (HSUPA) are being developed within the Universal Mobile Telecommunications System (UMTS) standard. However, higher date rates may necessitate better signal quality at both a mobile terminal (the mobile phone) and a base station.

For a mobile terminal at an edge of a mobile communications cell, the signal quality may be limited by thermal noise, noise figure of the mobile terminal, noise figure of the base station, as well as a channel quality (fading), limiting a reliable data transfer. Further, feasible high data rates may be obtained only closer to the base station.

To that end, a method to facilitate high data rates is to expand an active area for the mobile terminal. More specifically, a quantity of base stations is increased to minimize the distance between the mobile terminal and the base station. Another method to facilitate high data rates is to increase the signal quality at the mobile terminal. More specifically, a second receiver chain (diversity receiver) is employed at the mobile terminal.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The present application describes a tunable mutual antenna decoupling system. Many specific details are set forth in the following description and in FIGS. 1-5 to provide a thorough understanding of various implementations. One skilled in the art will understand, however, that the subject matter described herein may have additional implementations, or that the concepts set forth may be practiced without several of the details described in the following description. More specifically, a mobile terminal may comprise at least two antennas coupled together via a tuning circuit, with the tuning circuit altering a phase and an amplitude of a signal between the two antennas by control of a control unit.

System 100

Figure 1:
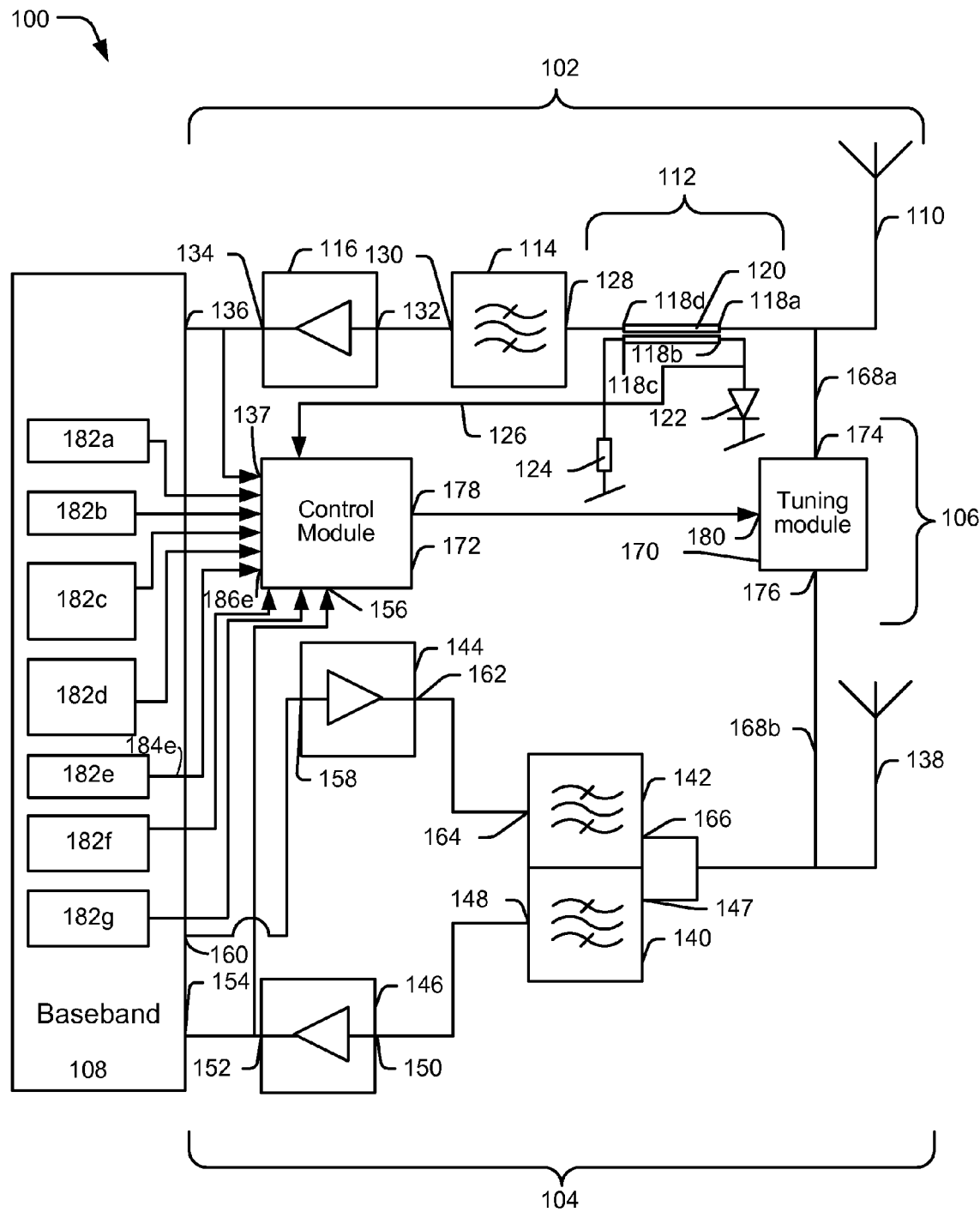
FIG. 1 is a block diagram of a tunable mutual antenna decoupling system, in a first embodiment.

FIG. 1 shows an overview of a tunable mutual antenna decoupling system 100 that may be employed within a mobile terminal. System 100 comprises a receiving portion 102, a transceiving portion 104, a control portion 106, and a baseband module 108.

Receiving Potion 102

Receiving portion 102 of system 100 receives a signal, i.e. a radio signal via a mobile communications network. Receiving portion 102 comprises an antenna 110, a detector module 112, a receiver (RX) front end filter 114, and a receiver low noise amplifier (LNA) 116.

Antenna 110 may be a planar inverted-F antenna (PIFA), however, antenna 110 may be any antenna desired. Antenna 110 may receive a signal $S_{radio}$ from any mobile communications network, including but not limited to 1G, 2G, 3G, 4G, LTE, WiMax, or any future mobile communications network. Antenna 110 is connected to an input terminal 118a of detector module 112.

Detector module 112 receives signal $S_{radio}$ and converts $S_{radio}$ from a RF signal to a DC voltage signal. Detector module 112 comprises a 4 port coupler 120, a diode 122, and a resistor 124. Diode 122 is connected to terminal 118b of coupler 120 and resistor 124 is connected to terminal 118c of coupler 120. A reflected signal $S_1$ may be input to control portion 106 via path 126. Diode 122 measures a reflected voltage from antenna 110 to RX front end filter 114 and produces signal $S_2$. An output terminal 118d of detector module 112 is connected to an input terminal 128 of RX front end filter 114.

RX front end filter 114 is configured to receive signal $S_2$ from detector module 112. Signal $S_2$ may comprises a receive portion and a transmit portion. To that end, RX front end filter 114 isolates signal $S_2$ such that signal $S_2$ comprises the receive portion. Further, RX front end filter 114 may minimize, if not prevent, interference between the receive portion and the transmit portion of signal $S_2$. RX front end filter 114 filters signal $S_2$ such that signal $S_2$ may comprise a desired frequency band, defining signal $S_3$. The desired frequency band of signal $S_3$ comprises substantially only reception signals to be received from the mobile communications network. An output terminal 130 of RX front end filter 114 is connected to an input terminal 132 of receiver LNA 116.

Receiver LNA 116 is configured to receive signal $S_3$ from RX front end filter 114. Receiver LNA 116 amplifies signal $S_3$, creating and outputting signal $S_4$. An output terminal 134 of receiver LNA 116 is connected to an input terminal 136 of baseband module 108 and an input terminal 137 of control portion 106, described further below.

Transceiving Portion 104

Transceiving portion 104 of system 100 also receives the aforementioned radio signal via the mobile communications network, and further transmits an additional signal via the mobile communications network. Transceiving portion 104 comprises an antenna 138, duplex filters 140 and 142, a transmitter power amplifier (PA) 144, and a receiver LNA 146.

Analogous to antenna 110 of receiving portion 102, antenna 138 may be a planar inverted-F antenna (PIFA), however, antenna 138 may be any antenna desired. Antenna 138 may receive the signal $S_{radio}$ from any mobile communications network. In a further implementation, antenna 138 may receive a differing signal from the mobile communications network. Antenna 138 may also transmit a signal $S_{transmit}$, described further below. Antenna 138 is connected to input terminal 147 of duplex filter 142.

Analogous to RX front end filter 114, duplex filter 140 is configured to receive signal $S_{radio}$ from antenna 138. Signal $S_{radio}$ may comprise a receive portion and a transmit portion. To that end, duplex filter 140 isolates signal $S_{radio}$ such that signal $S_{radio}$ comprises the receive portion. Further, duplex filter 140 may minimize, if not prevent, interference between the receive portion and the transmit portion of signal $S_{radio}$. Duplex filter 140 filters signal $S_{radio}$ such that signal $S_{radio}$ may comprise a desired frequency band, defining signal $S_4$. The desired frequency band of signal $S_4$ comprises substantially only reception signals to be received from the mobile communications network. An output terminal 148 of duplex filter 140 is connected to an input terminal 150 of receiver LNA 146.

Receiver LNA 146 is configured to receive signal $S_4$ from duplex filter 140. Receiver LNA 146 amplifies signal $S_4$, creating and outputting signal $S_5$. An output terminal 152 of receiver LNA 146 is connected to an input terminal 154 of baseband module 108 and an input terminal 156 of control portion 106, described further below.

An input terminal 158 of transmitter PA 144 is connected to an output terminal 160 of baseband module 108. Transmitter PA 144 is configured to receive a signal $S_6$ from baseband module 108 and amplify the same, creating and outputting a signal $S_7$. An output terminal 162 of transmitter PA 144 is connected to an input terminal 164 of duplex filter 142.

Duplex filter 142 is configured to receive signal $S_7$ from transmitter PA 144. Signal $S_7$ may comprise a receive portion and a transmit portion. To that end, duplex filter 142 isolates signal $S_7$ such that signal $S_7$ comprises the receive portion. Further, duplex filter 142 may minimize, if not prevent, interference between the receive portion and the transmit portion of signal $S_7$. Duplex filter 142 filters signal $S_7$ such that signal $S_7$ may comprise a desired frequency band, defining signal $S_{transmit}$. The desired frequency band of signal $S_{transmit}$ comprises substantially only transmission signals to be transmitted to the mobile communications network. An output terminal 166 of duplex filter 142 is connected to antenna 138. Antenna 138 may transmit signal $S_{transmit}$ to the mobile communications network.

In a further embodiment, system 100 may comprise more than two antennas.

Mutual Coupling of Antennas 110 and 138

Antennas 110 and 138 may be located physically proximate to one another within system 100. Upon excitation of either (or both) of antennas 110 and 138, energy may be transferred from antenna 110 to antenna 138 (or from antenna 138 to antenna 110). As such, antennas 110 and 138 may be mutually coupled. However, a low mutual coupling between antennas 110 and 132 may be desired, i.e. antenna isolation may be desired. A low mutual coupling may lead to at least 1) optimized diversity gain of antennas 110 and 138; 2) low absorption of transmitted power in antennas 110 and 138; and 3) optimal filter requirements of signal $S_{transmit}$.

Further, the mutual coupling between antennas 110 and 138 may further be altered dynamically as a result of user interference. More specifically, either (or both) of antennas 110 and 138 may be covered (partially or fully) by a user using the mobile terminal, and thus, result in signal loss. Further, a position (free-space, talk, on table, etc.) of system 100, and specifically antennas 110 and 138, may alter the mutual coupling thereof.

To that end, to minimize, if not prevent, the mutual coupling between antennas 110 and 138, antennas 110 and 138 may be coupled to one another via a tuning strip 168 and a tuning module 170, described further below.

Control Portion 106

Control portion 106 of system 100 controls a mutual coupling between antennas 110 and 138. Control portion 106 comprises the tuning module 170 and a control module 172.

Figure 2:
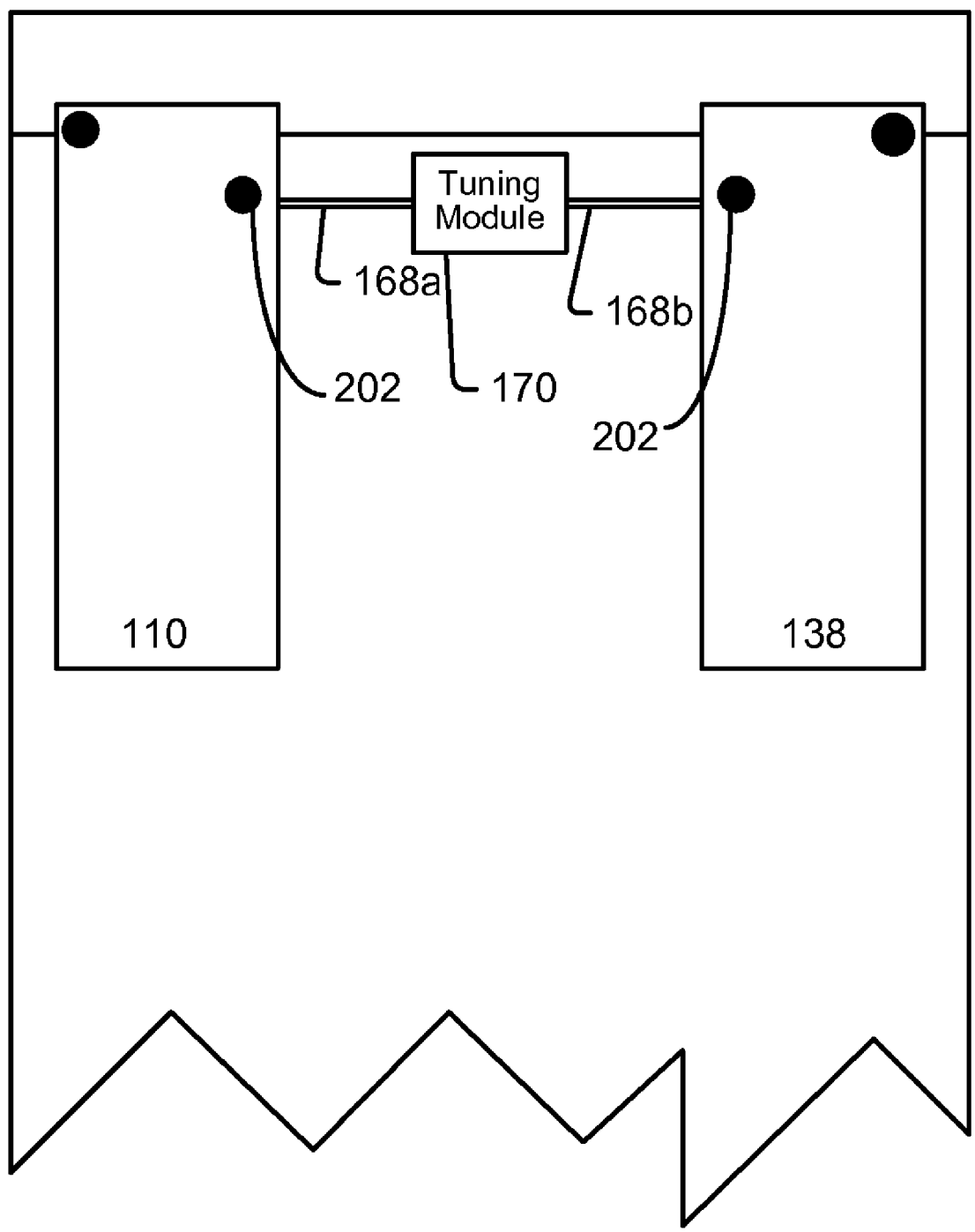
FIG. 2 is a block diagram of tunable mutual antenna decoupling system, in a second embodiment.
Figure 3A:
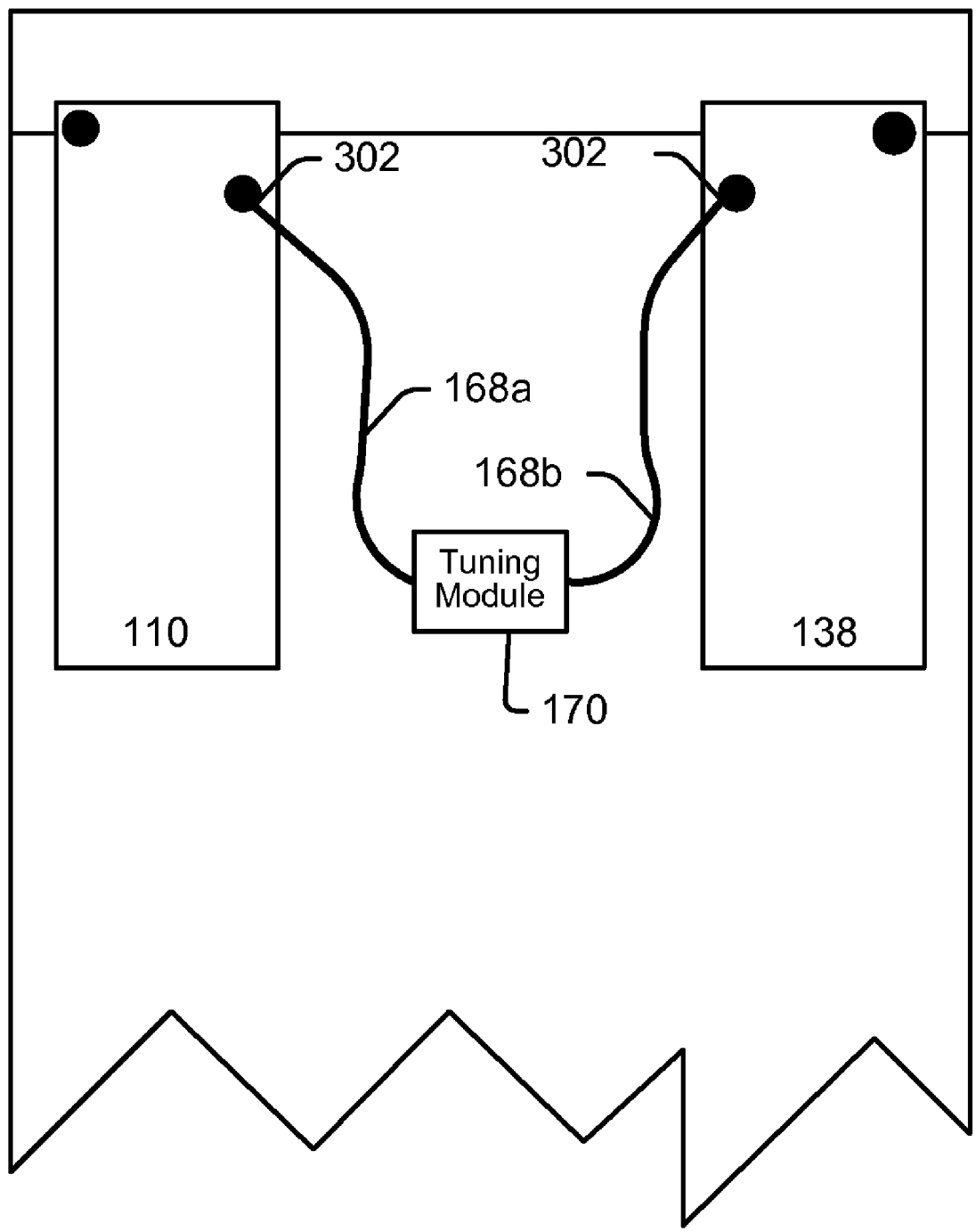
FIGS. 3a-3b is a block diagram of tunable mutual antenna decoupling system, in a third and a fourth embodiment.
Figure 3B:
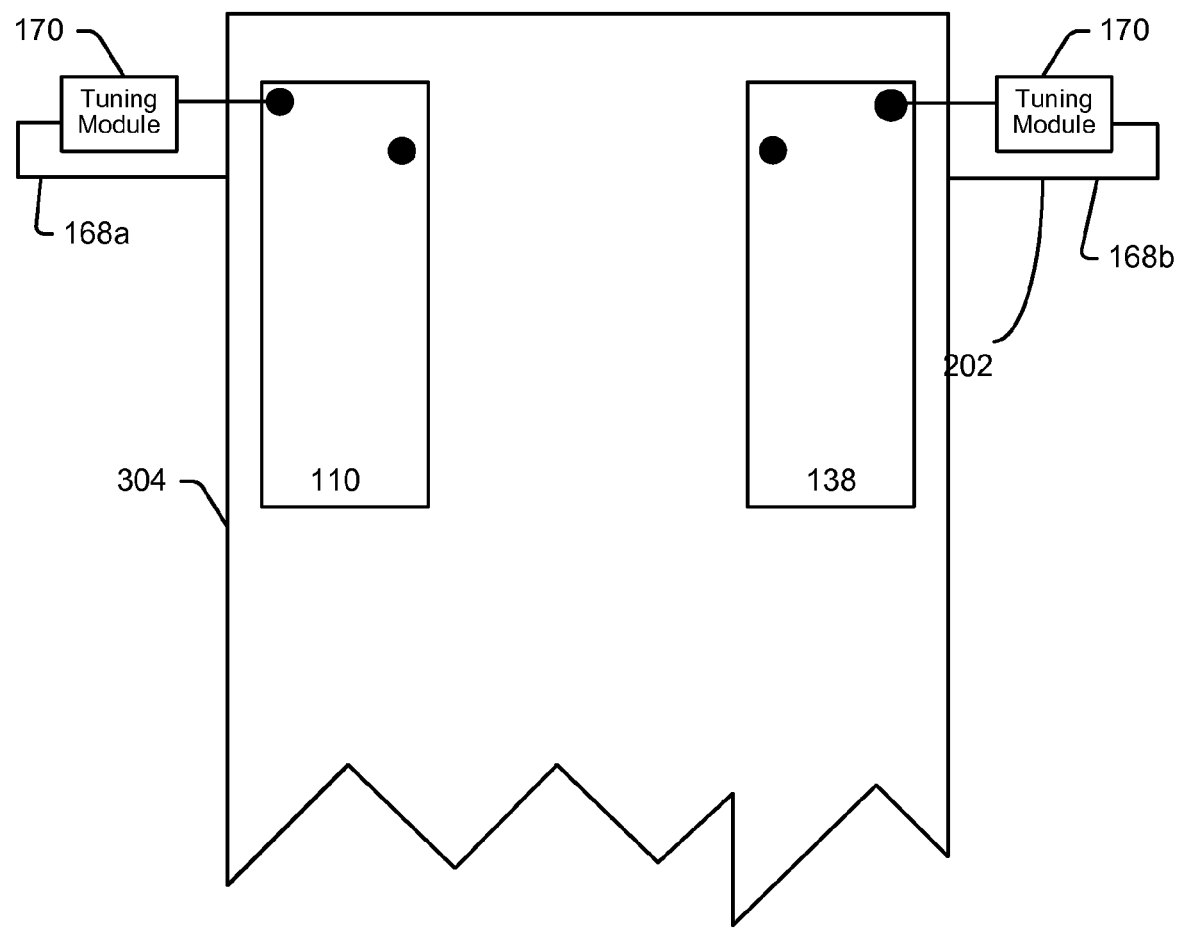

Tuning module 170 is connected to antenna 110 via tuning strip 168a and is further connected to antenna 138 via tuning strip 168b. More specifically, an output terminal 174 of tuning module 170 is connected to antenna 110 via tuning strip 168a and an output terminal 176 of tuning module 160 is connected to antenna 138 via tuning strip 168b. In a further implementation, as shown in FIG. 2, tuning strips 168 may be connected to metal plates 202 of antennas 110 and 138. In still a further implementation, as shown in FIG. 3a, tuning strips 168 may be connected to feeding ports 302 of antennas 110 and 138. In still a further implementation, as shown in FIG. 3b, tuning strips 168 may be connected to a ground plane 304 of antennas 110 and 138.

To that end, a signal $S_9$ may be transmitted between antennas 110 and 138. At a specific frequency (or frequency band) that antennas 110 and 138 receive signal $S_{radio}$, signal $S_9$ may minimize, if not prevent, the mutual coupling between antennas 110 and 138 and further provide an improved antenna isolation in a frequency range (single band) around the specific frequency.

Furthermore, to minimize, if not prevent, mutual coupling between antennas 110 and 138 for a plurality of frequency bands (multi band) that antennas 110 and 138 may receive signal $S_{radio}$, tuning module 160 may dynamically alter a phase and an amplitude of signal $S_9$, described further below. Also, as mentioned above, user interference may alter the mutual coupling between antennas 110 and 138. As a result, tuning module 160 also alters the phase and amplitude of signal $S_9$ in relation to user interference and positional changes of system 100.

Control module 172 facilitates minimizing, if not preventing, mutual coupling between antennas 110 and 138 by controlling tuning module 170. An output terminal 178 of control module 172 is connected to an input terminal 180 of tuning module 170 and is configured to receive a signal $S_{10}$ from control module 172. Control module 172 determines signal $S_{10}$ based upon multiple parameters from baseband module 108 and a received signal strength indication (RSSI) parameter from receiver LNAs 116 and 146, described further below.

Baseband Module 108

Baseband module 108 determines a plurality of parameters that control module 172 employs to determine signal $S_{10}$ (and ultimately, signal $S_9$). More specifically, baseband module 108 comprises parameters modules 182, such as a bit error rate (BER) module 182a, a power control module 182b, a forward power module 182c, a reflected power module 182d, a use module 182e, a sensor module 182f, and a current consumption module 182g.

The details of parameter modules 182 of baseband module 108 are as follows:

BER module 182a determines a lowest possible BER.

The power level required to obtain a desired performance in the uplink by the mobile terminal is sent by the mobile communications network. As such, power control module 182b determines a minimum power control level feedback from the mobile communications network.

The decoupling of antennas 110 and 138 may be optimized for minimum transmission power at either antenna 110 or 138 (or both). If power at a detector is coming from the transmission or other sources, the forward power may be measured with a directional coupler and a detector at forward power module 182c.

The reflected power module 182d detects if either antenna 110 or 138 (or both) is detuned. The reflected power module 182d may comprise a directional coupler (not shown) and a detector (not shown).

The use module 182e determines an influence of user interaction and provides statistical data such as a position of the user's hands and/or head.

The sensor module 182f provides data via sensors on a casing of the mobile terminal of user interaction.

The current consumption module 182g minimizes the current consumption, and in particular, the current consumption of receiver LNA 116 and 146 and transmitter PA 144. The current consumption of transmitter PA 144 is dependent upon the load at transmitter PA 144.

Each of modules 182a-g comprise an output terminal 184a-g, respectively. Further, an input terminal 186a-g of control module 172 is connected to an output terminal 184a-g, respectively, of modules 182a-g. As a result, the control parameters determined by modules 182a-g are communicated to control module 172. For simplicity of illustration, only output terminal 184e and input terminal 186e are labeled.

RSSI Signal

As mentioned above, control module 172 also determines signal $S_{10}$ based upon a received signal strength indication (RSSI) parameter from receiver LNAs 116 and 146. Also, as mentioned, the output terminal 134 of receiver LNA 116 is connected to the input terminal 138 of control portion 106 (i.e. control module 172) and the output terminal 152 of receiver LNA 146 is connected to an input terminal 156 of control portion 106 (i.e. control module 172).

The RSSI parameter is optimized if a magnitude of $S_{radio}$ is below a certain threshold. This control parameter is communicated to control module 164.

Tuning of Tuning Module 170

As mentioned above, control module 172 determines signal $S_{10}$ based upon multiple parameters from parameter modules 182 of baseband module 108 and a received signal strength indication (RSSI) parameter from receivers 116 and 146. Based upon these parameters, control module 172 tunes tuning module 170 via signal $S_{10}$ such that signal $S_9$ communicated to antennas 110 and 138 via tuning module 170 results in minimizing, if not preventing, a mutual coupling between antennas 110 and 138. More specifically, control module 172 tunes tuning module 170 via signal $S_{10}$ to alter phase and amplitude of signal $S_9$ such that the phase and the amplitude of signal $S_9$ communicated to antennas 110 and 138 via tuning module 170 results in minimizing, if not preventing, a mutual coupling between antennas 110 and 138.

The tuning of tuning module 170 may be done iteratively for each parameter, wherein each parameter may be weighted according to an importance, depending on the application desired. Further, signal $S_{10}$ may comprise a product of the weighted parameters.

System 400

Figure 4:
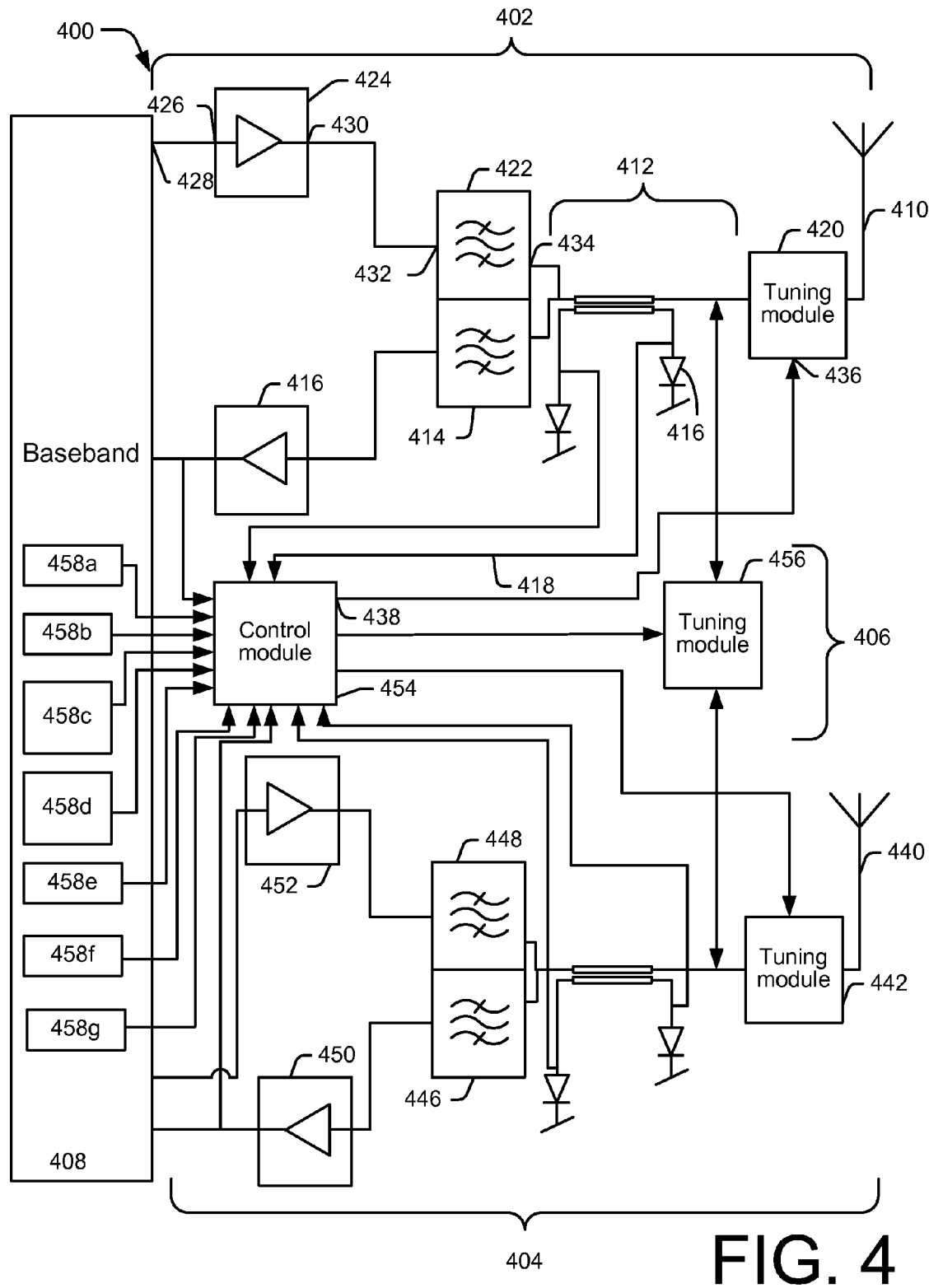
FIG. 4 is a block diagram of tunable mutual antenna decoupling system, in a fourth embodiment.

FIG. 4 shows an additional implementation of a tunable mutual antenna system 400. System 400 comprises transceiving portions 402 and 404, control portion 406, and baseband module 408.

Transceiving Portion 402

Portions of transceiving portion 402 are analogous to receiving portion 102 mentioned above with respect to FIG. 1. More specifically, antenna 410, detector module 412, duplex filter 414, and receiver PA 416 are analogous to antenna 110, detector module 112, RX front end filter 114, and receiver LNA 116, respectively, of FIG. 1. As such, any reference to any portion of the analogous portions of receiving portion 102 may be applied analogous to the corresponding portion of transceiving portion 402. However, detector module 412 differs slightly from detector module 112. More specifically, detector module 412 comprises an additional diode 416 in place of resistor 124. Further, an additional reflected signal $S_1$, may be input to control portion 106 via path 418.

Further, transceiving portion 402 comprises a tuning module 420, an additional duplex filter 422, and a transmitter PA 424.

Transmitter PA 424 and Additional Duplex Filter 422

An input terminal 426 of transmitter PA 424 is connected to an output terminal 428 of baseband module 408. Transmitter PA 424 is configured to receive a signal $S_{11}$ from baseband module 408 and amplify the same, creating and outputting a signal $S_{12}$. An output terminal 430 of transmitter PA 424 is connected to an input terminal 432 of duplex filter 422.

Analogous to duplex filters 414, duplex filter 422 is configured to receive signal $S_{11}$ from transmitter PA 424. Signal $S_{11}$ may comprise a receive portion and a transmit portion. To that end, duplex filter 422 isolates signal $S_{11}$ such that signal $S_{11}$ comprises the transmit portion. Further, duplex filter 422 may minimize, if not prevent, interference between the receive portion and the transmit portion of signal $S_{11}$. Duplex filter 422 filters signal $S_{11}$ such that signal $S_{11}$ may comprise a desired frequency band, defining signal $S_{12}$. The desired frequency band of signal $S_{12}$ comprises substantially only transmission signals to be transmitted to the mobile communications network. An output terminal 434 of duplex filter 422 is connected to detector module 412.

Tuning Module 420

Tuning module 420 tunes a frequency band that antenna 410 may receive signals via the mobile communications network. An input terminal 436 of tuning module 420 is connected to an output terminal 438 of control portion 406. Tuning module 420 is configured to receive a signal $S_{13}$ from control portion 406, described further below.

In an implementation, tuning module 420 comprises switches combined with a single or multiple capacitors and/or inductors (e.g. a capacitor bank, an inductor bank, and a capacitor & inductor bank). By employing RF switches, the tuning of tuning module 420 is in discrete steps (e.g. 4 elements in the bank allow 4 bit control). The types of switches include, but are not limited to, RF MEMS (ohmic and/or capacitive), pin diodes, transistor, silicon on sapphire, PHEMT, and MESFET. The capacitors may be discrete SMD type capacitors and/or a combination of thin film capacitors. The values of the capacitors may be controlled by an analog voltage, i.e. controlled by a diode, varactor, dielectric based material, RF MEMS based capacitors.

Transceiving Portion 404

Transceiving portion 404 is analogous to transceiving portion 402. As such, any reference to any portion of transceiving portion 402 may be applied analogous to the corresponding portion of transceiving portion 404. In an example, antenna 440, tuning circuit 442, detector module 444, duplex filters 446 and 448, receiver PA 450, and transmitter PA 452 is analogous to antenna 410, tuning circuit 420, detector module 412, duplex filters 414 and 422, receiver PA 424, and transmitter 416, respectively.

Control Portion 406

Control portion 406 is analogous to control portion 106 of FIG. 1. More specifically, control module 454 and tuning module 456 are analogous to control module 172 and tuning module 170 of FIG. 1, respectively.

Further, control module 454 controls a tuning of tuning module modules 436 and 442 via signal $S_{13}$. More specifically, control module 454 controls tuning modules 420 and 442 such that tuning modules 420 and 442 alter a frequency band which antennas 410 and 440 receive signals from the mobile communications network. In an example, control modules 454 controls tuning modules 420 and 442 such that tuning modules 420 and 442 alter the frequency band of antennas 410 and 440 such that antennas 410 and 442 receive a signal at substantially the same frequency.

Baseband Module 408

Baseband Module 408 is analogous to baseband module 108 of FIG. 1. More specifically, parameter modules 458 are analogous to parameter modules 182 of FIG. 1.

Process Model 500

Figure 5:
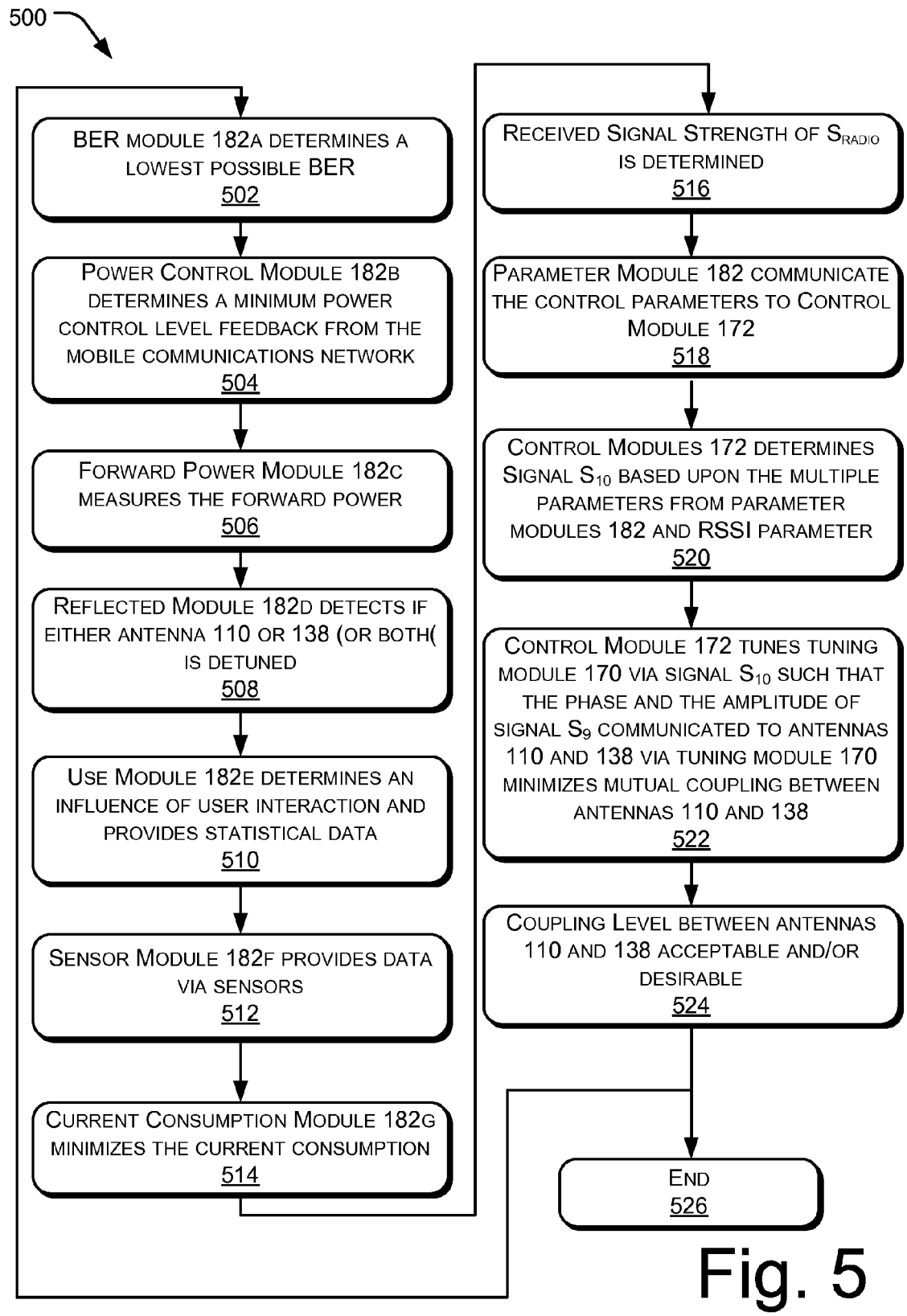
FIG. 5 is a flowchart of employing the system of FIG. 1, in a first implementation.

FIG. 5 shows a method 500 of employing system 100. The process 500 is illustrated as a collection of referenced acts arranged in a logical flow graph, which represent a sequence that can be implemented in hardware, software, or a combination thereof. The order in which the acts are described is not intended to be construed as a limitation, and any number of the described acts can be combined in other orders and/or in parallel to implement the process.

At step 502, BER module 182a determines a lowest possible BER.

At step 504, power control module 182b determines a minimum power control level feedback from the mobile communications network At step 506, forward power module 182c measures the forward power.

At step 508, reflected module 182d detects if either antenna 110 or 138 (or both) is detuned.

At step 510, use module 182e determines an influence of user interaction and provides statistical data such as a position of the user's hands and/or head.

At step 512, sensor module 182f provides data via sensors on a casing of the mobile terminal of user interaction.

At step 514, current consumption module 182g minimizes the current consumption, and in particular, the current consumption of receiver LNA 116 and 146 and transmitter PA 144.

At step 516, a received signal strength of $S_{radio}$ is determined.

At step 518, parameter modules 182 communicate the control parameters to control module 172.

At step 520, control module 172 determines signal $S_{10}$ based upon the multiple parameters from parameter modules 182 of baseband module 108 and a received signal strength indication (RSSI) parameter from receiver PAs 116 and 146.

At step 522, control module 172 tunes tuning module 170 via signal $S_{10}$ such that the phase and the amplitude of signal $S_9$ communicated to antennas 110 and 138 via tuning module 170 result in minimizing, if not preventing, a mutual coupling between antennas 110 and 138.

At step 524, it is determined if a coupling level between antennas 110 and 138 is acceptable and/or desirable. If the coupling level between antennas 110 and 138 is acceptable and/or desirable, the process is ended at step 526. If the coupling level between antennas 110 and 138 is not acceptable and/or desirable, process 500 is repeated iteratively until the coupling level between antennas 110 and 138 is acceptable and/or desirable.

Process Model 600

Figure 6:
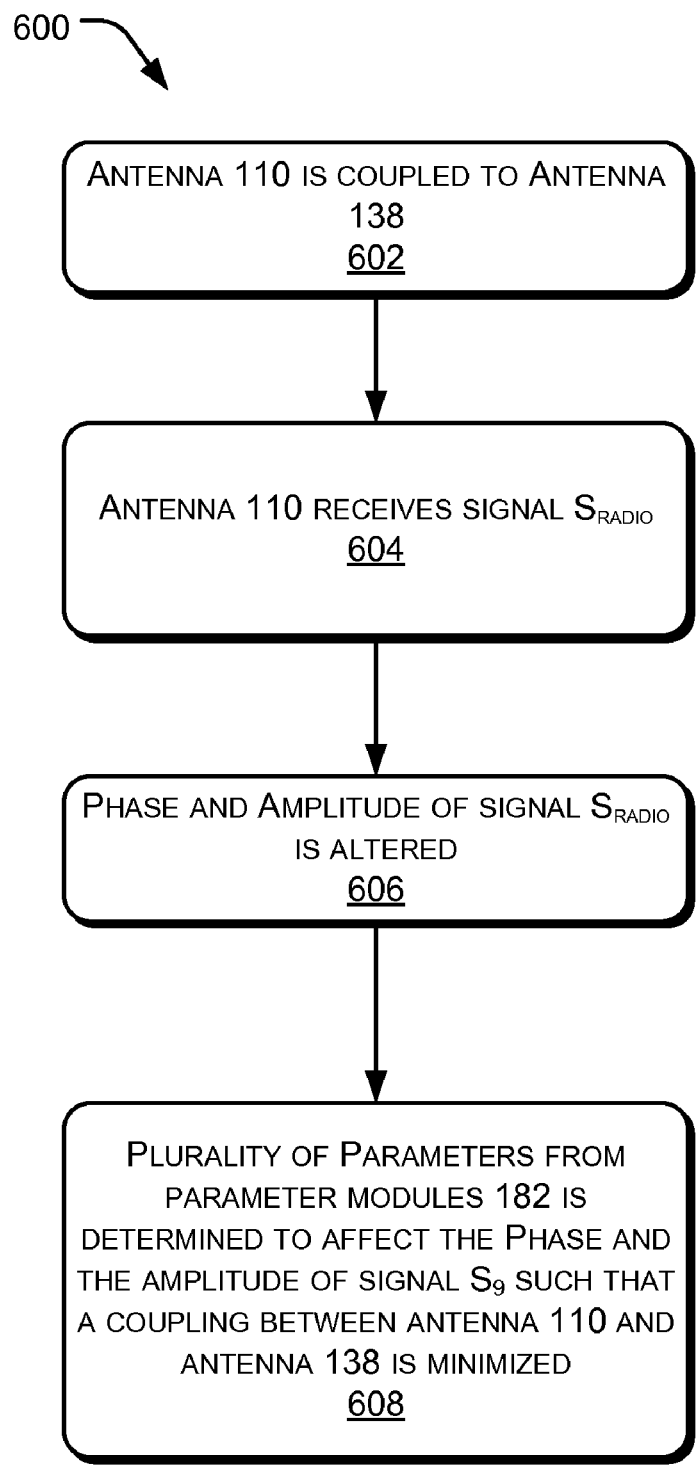
FIG. 6 is a flowchart employing system of FIG. 1, in a further implementation.

FIG. 6 shows a method 600 of employing system 100. The process 600 is illustrated as a collection of referenced acts arranged in a logical flow graph, which represent a sequence that can be implemented in hardware, software, or a combination thereof. The order in which the acts are described is not intended to be construed as a limitation, and any number of the described acts can be combined in other orders and/or in parallel to implement the process. Further, FIG. 6 references elements of FIG. 1.

At step 602, antenna 110 is coupled to antenna 138.

At step 604, antenna 110 receives signal $S_{radio}$.

At step 606, a phase and an amplitude of signal $S_9$ (control signal) is altered.

At step 608, a plurality of parameters from parameter modules 182 is determined to affect the phase and the amplitude of signal $S_9$ such that a mutual coupling between antenna 110 and antenna 138 is minimized.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a receiving portion, comprising a first antenna, to receive a first radio signal;
a transceiving portion, comprising a second antenna, to receive the first radio signal and transmit a second radio signal, the second radio signal differing from the first radio signal;
a baseband module;
a control portion comprising:
a tuning module; and
a control module coupled between the baseband module and the tuning module, the control module configured to determine a tuning signal between the control module and the tuning module such that the tuning module alters a phase and an amplitude of a control signal between the tuning module and the first and the second antenna;
wherein the baseband module determines a plurality of parameters that affect the phase and the amplitude of the control signal such that a mutual coupling between the first antenna and the second antenna is minimized.

2. The system as recited in claim 1, the receiving portion further comprising a duplex filter to isolate the first radio signal such that the first radio signal comprises a desired frequency band.

3. The system as recited in claim 2, wherein the receiving portion further comprises a rectifying module coupled between the first antenna and the duplex filter to convert the first radio signal to a DC voltage signal.

4. The system as recited in claim 1, the transceiving portion further comprising a first duplex filter to isolate the first radio signal such that the first radio signal comprises a desired frequency band and a second duplex filter to isolate the second radio signal such that the second radio signal comprises a desired frequency band.

5. The system as recited in claim 1, the baseband portion further comprising a plurality of parameter modules, the parameter modules comprising a bit error rate (BER) module, a power control module, a forward power module, a reflected power module, a use module, a sensor module, and a current consumption module.

6. The system as recited in claim 1 wherein the receiving portion and the transceiving portion comprising a plurality of antennas.

7. The system as recited in claim 1 wherein the mutual coupling is minimized about a plurality of frequency bands of the first radio signal.

8. A system comprising:
a first transceiving portion, comprising a first antenna, to receive a first radio signal and transmit a second radio signal, the second radio signal differing from the first radio signal;
a second transceiving portion, comprising a second antenna, to receive the first radio signal and transmit the second radio signal;
a control portion coupled to the first and the second antenna, the control portion configured to alter a phase and an amplitude of a control signal between the first and the second antenna and the control portion; and
a baseband module, in communication with the control portion, to determine a plurality of parameters to affect the phase and the amplitude of the signal such that a mutual coupling between the first antenna and the second antenna is minimized.

9. The system as recited in claim 8, the first transceiving portion further comprising a first duplex filter to isolate the first radio signal such that the first radio signal comprises a desired frequency band and a second duplex filter to isolate the second radio signal such that the second radio signal comprises a desired frequency band.

10. The system as recited in claim 9, the second transceiving portion further comprising a first duplex filter to isolate the first radio signal such that the first radio signal comprises a desired frequency band and a second duplex filter to isolate the second radio signal such that the second radio signal comprises a desired frequency band.

11. The system as recited in claim 10, the control portion further comprising a control module and a tuning module, the control module coupled between the baseband module and the tuning module, the tuning module coupled between the control module and the first and the second antenna, the tuning module receiving an additional signal from the control module and outputting the signal to the first and the second antenna to minimize the mutual coupling between the first antenna and the second antenna.

12. The system as recited in claim 11, the baseband portion further comprising a plurality of parameter modules, the parameter modules comprising a bit error rate (BER) module, a power control module, a forward power module, a reflected power module, a use module, a sensor module, and a current consumption module.

13. The system as recited in claim 12, wherein the receiving portion further comprises a rectifying module coupled between the first antenna and the duplex filter to convert the first radio signal to a DC voltage signal.

14. The system as recited in claim 13, wherein the receiving portion and the transceiving portion comprising a plurality of antennas.

15. The system as recited in claim 14, wherein the mutual coupling is minimized about a plurality of frequency bands of the first radio signal.

16. The system as recited in claim 15, wherein the control portion is coupled to the first and the second antenna via tuning strips.

17. A method comprising:
coupling a first antenna with a second antenna;
receiving a radio signal by the first antenna;
altering a phase and an amplitude of a control signal between the first and the second antenna and a control portion coupled to the first and the second antenna; and
determining a plurality of parameters to affect the phase and the amplitude of the signal such that a mutual coupling between the first antenna and the second antenna is minimized.

18. The method as recited in claim 17 further comprising receiving the radio signal by the second antenna.

19. The method as recited in claim 17 further comprising transmitting an additional radio signal by the first antenna.

20. The method as recited in claim 17 wherein the mutual coupling is minimized about a plurality of frequency bands of the first radio signal.

* * * * *